(12) United States Patent
Sautter et al.

(10) Patent No.: US 7,034,699 B2
(45) Date of Patent: Apr. 25, 2006

(54) RAIN SENSOR, ESPECIALLY FOR A MOTOR VEHICLE

(75) Inventors: Helmut Sautter, Ditzingen (DE); Armin Jerger, Buehl (DE); Frank Wolf, Buehlertal (DE); Gerhard Hochenbleicher, Fürstenfeldbruck (DE); Vincent Thominet, Morges (FR); Zishao Yang, Erding (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/484,755

(22) PCT Filed: Jan. 30, 2003

(86) PCT No.: PCT/DE03/00251

§ 371 (c)(1),
(2), (4) Date: Jul. 1, 2004

(87) PCT Pub. No.: WO2004/002789

PCT Pub. Date: Jan. 8, 2004

(65) Prior Publication Data

US 2004/0232363 A1 Nov. 25, 2004

(30) Foreign Application Priority Data

Jun. 28, 2002 (DE) .................. 102 29 239

(51) Int. Cl.
*G08B 21/00* (2006.01)

(52) U.S. Cl. ..................... 340/602; 318/483
(58) Field of Classification Search ........... 340/602
See application file for complete search history.

(56) References Cited

U.S. PATENT DOCUMENTS

| 4,166,960 | A | * | 9/1979 | Meili .................... 250/574 |
| 4,397,557 | A | * | 8/1983 | Herwig et al. .......... 356/342 |
| 4,841,157 | A | * | 6/1989 | Downing, Jr. .......... 250/574 |
| 5,804,719 | A | * | 9/1998 | Didelot et al. ......... 73/335.01 |
| 6,307,198 | B1 | * | 10/2001 | Asakura et al. ...... 250/227.25 |
| 6,842,271 | B1 | * | 1/2005 | Sautter et al. ............. 359/15 |
| 2002/0040964 | A1 | * | 4/2002 | Dausmann et al. .... 250/227.25 |

FOREIGN PATENT DOCUMENTS

| DE | 199 43 887 | 3/2000 |
| EP | 0 249 031 | 12/1987 |
| EP | 0 736 426 | 10/1996 |
| EP | 0 999 104 | 5/2000 |
| EP | 999104 A2 * | 5/2000 |
| JP | 2000/266665 | 1/2001 |

* cited by examiner

Primary Examiner—Jeffery Hofsass
Assistant Examiner—George A. Bugg
(74) Attorney, Agent, or Firm—Kenyon & Kenyon, LLP

(57) ABSTRACT

A rain sensor, particularly for a motor vehicle, includes a light-conducting member arranged in an intermediate layer of a glass, and is designed as an optically closed system.

16 Claims, 3 Drawing Sheets

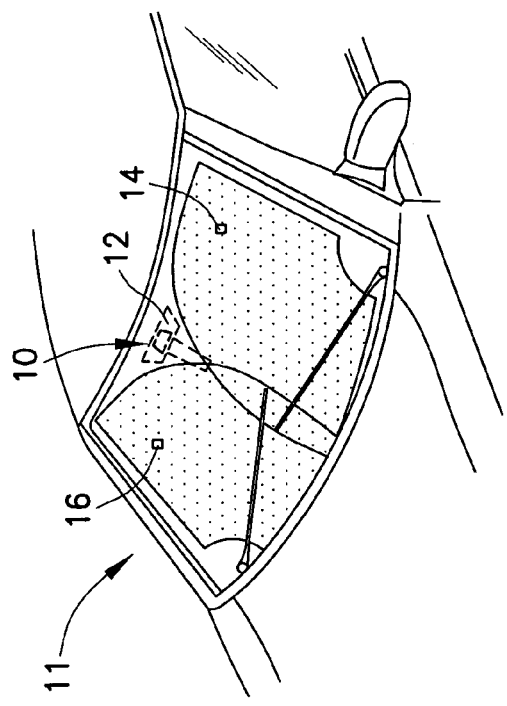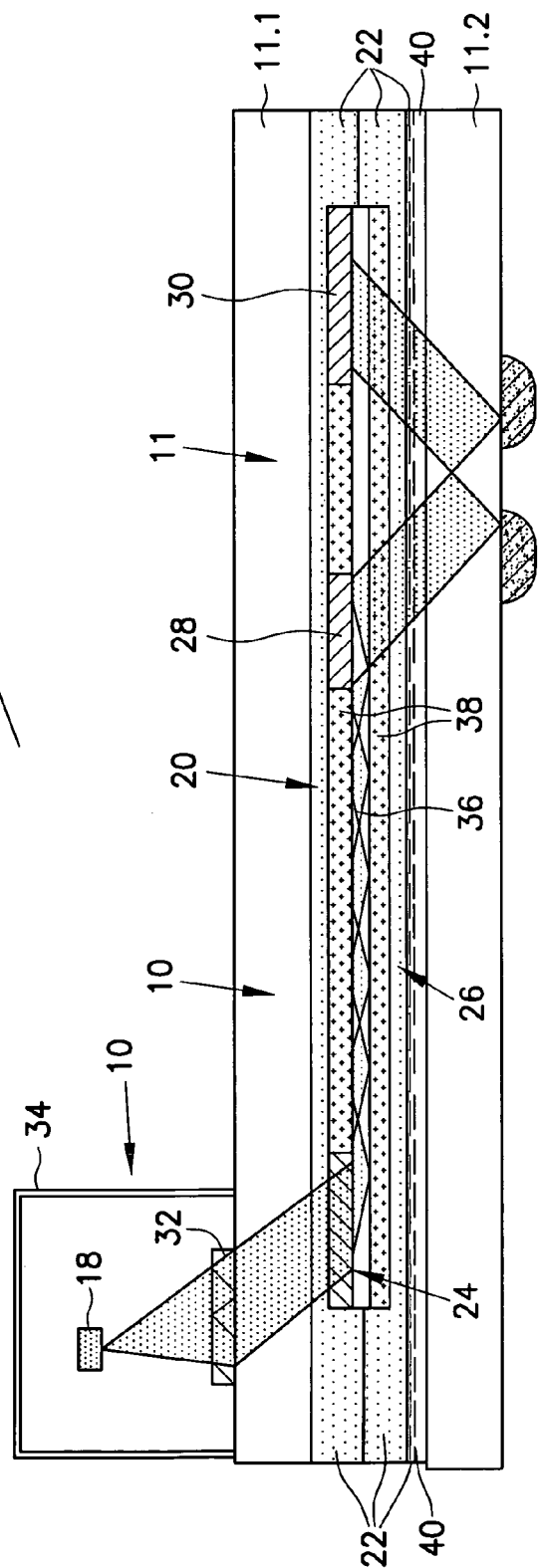

RAIN SENSOR, ESPECIALLY FOR A MOTOR VEHICLE

BACKGROUND INFORMATION

German Patent Application No. 199 43 887 has already described a rain sensor, in which the light of an infrared transmitter is radiated from the inside of the motor vehicle out in the direction of the outside through the laminate safety glass. At the outside of the glass—assuming a clean glass—the light is totally reflected and returned inwards. Disposed in the intermediate layer of the laminate safety glass is a retro-reflector which returns the light offset by a small angle, so that it may be coupled out in the region of the transmitter.

SUMMARY OF THE INVENTION

The rain sensor of the present invention has the advantage that the light-conducting member is designed as an optically closed system. In this way, the sensitive area is able to extend far into the glass, which is particularly advantageous for windshields which are cleaned by two wipers moving in the opposite direction, since in these systems, the wipe pattern has a wedge-shaped cut in the region of the center interior mirror at which the rain sensor is usually positioned. Moreover, such a design provides a substantially larger sensitive area, thereby increasing the sensitivity of the rain sensor and improving the response.

It is particularly advantageous if the light-conducting member has a light-conducting core and an optically insulating sheath, since in this way, the coupling in of interfering extraneous light is minimized, and moreover, the loss of useful light is reduced.

It must also be regarded as advantageous if the light-conducting member has a coupling-in element for coupling radiation into the intermediate layer of the glass.

Because the light-conducting member has a guide element for guiding the radiation in the glass, the sensitive area may be arranged at any position on the glass.

Because the light-conducting member has a coupling-out element for coupling the radiation out of the guide element, it may be produced inexpensively as an integrated component.

The transmitter and the receiver of the rain sensor may advantageously be arranged spatially close next to each other if the light-conducting member has a retro-reflector for reflecting the radiation.

It is particularly advantageous if the coupling-in element is formed as a hologram, particularly as an embossed surface hologram.

Moreover, it is especially advantageous if the guide element and/or the coupling-out element is formed as a hologram, particularly as a volume hologram. In this way, the guide element and the coupling-out element are transparent for the driver of the motor vehicle, and therefore do not restrict the field of view for the driver.

In one cost-saving variant, the optically insulating sheath is sticky or is itself made of adhesive.

In one simple embodiment of the rain sensor according to the present invention, it has a further light-conducting member for coupling the radiation into the glass.

In a further improvement, the light-conducting member is brought out of one end face of the glass, since in this way, the radiation may be coupled directly into the light-conducting member.

Generally, it is advantageously possible to form the light-conducting member as an optical fiber, and to conduct the light as radiation through it from the transmitter into the receiving area and again into the receiver.

BRIEF DESCRIPTION OF THE DRAWINGS

FIG. 1 shows the front of a motor vehicle having a sensor according to the present invention.

FIG. 2 shows a section through the windshield of a motor vehicle having a sensor according to the present invention.

DETAILED DESCRIPTION

Figure 3:
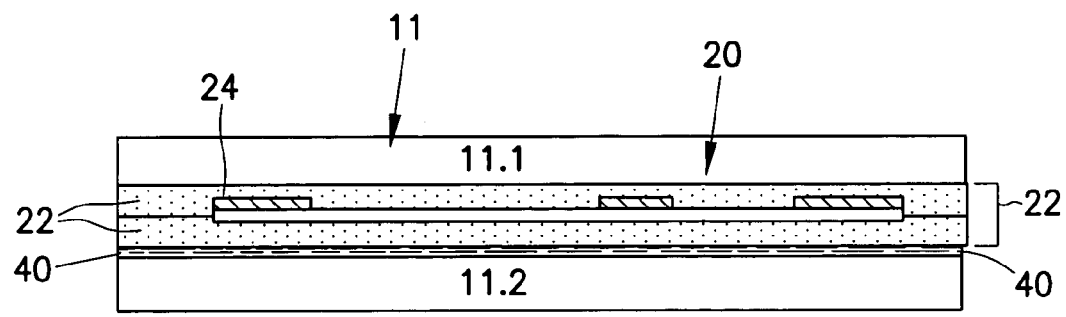
FIGS. 3 through 8 show different variants of the rain sensor according to the present invention from FIG. 2.

FIG. 1 shows a motor vehicle having a rain sensor 10 according to the present invention. This rain sensor 10 is mounted on the windshield in the region of interior mirror 12, and extends at least partially into wiping areas 14, 16.

FIG. 2 shows a rain sensor 10 of the present invention in a section with (windshield) glass 11. Rain sensor 10 is made up essentially of a transmitter 18 that is able to emit radiation, e.g. infrared light radiation, and a light-conducting member 20 arranged in glass 11.

Glass 11 is constructed as a customary laminate safety glass having a multilayer cross-section. An inner glass layer 11.1 and an outer glass layer 11.2 are provided, which are joined by an adhesive intermediate layer 22. For example, this intermediate layer 22 may also include one or more functional layers 40 that are heatable or absorb infrared light.

Arranged in intermediate layer 22, 40 is light-conducting member 20 that has a plurality of regions in its lateral extension and is also multilayer in cross-section. Light-conducting member 20 is made up of a light-conducting core 36 surrounded by an optically insulating sheath 38. To couple the radiation in and out, light-conducting member 20 also has a coupling-in element 24 and a coupling-out element 28 that are interconnected by a guide, element 26. Light-conducting member 20 also has a retro-reflector 30 that is able to retroreflect the radiation again in the region of transmitter 18. Sheath 38 has corresponding openings in the region of elements 24, 28 and 30. This may be implemented most easily if the sheath layer is formed as a continuous layer that, for example, by photolithographic processes, obtains the characteristic of holograms with the desired coupling-in and coupling-out properties.

Furthermore, another light-conducting member 32 is provided which is arranged on inner glass 11.1 and directs the radiation of transmitter 18 in the direction of coupling-in element 24.

The radiation then moves from transmitter 18 through further light-conducting member 32 to coupling-in element 24. It is constructed in such a way that the radiation is coupled into guide element 26, and from there is guided to coupling-out element 28. Coupling-out element 28 is designed so that it directs the radiation out of guide element 26 in the direction of the outside of glass 11, in the direction of the detection area. When glass 11 is clean and dry, the light is totally reflected at the glass-air interface in the direction of retro-reflector 30. It returns the radiation, tipped through a small angle, so that after a total reflection at the glass-air interface in the detection area, it is reflected via coupling-out element 28, guide element 26 and coupling-in element 24 into the region of transmitter 18, in which region a receiver—not marked here—is located. It detects the radiation, which is reduced at least by the portion that was coupled out at the moistened interface, and thus at a glasswater interface. Since the interface is touched twice by the radiation, the effect is doubled in comparison to the current rain sensors. The receiver is arranged close to transmitter 18, and both are accommodated in one small housing 34. Thus, the largest part of the sensor is outside of housing 34, so that it remains small and, for example, may be positioned behind interior mirror 12 of the motor vehicle. Housing 34 also houses a printed-circuit board, on which transmitter 18 and the receiver are directly secured, preferably using SMD (surface-mounting) technology. Further components such as a heating device, a cooling device, as well as the control device for controlling the windshield wiping device of the motor vehicle may also be accommodated here.

In principle, it is also possible to provide adhesive layer 22 as a sheath layer. In this case, the refractive index of the adhesive layer must be less than the refractive index of the core, in order to achieve the optical insulation.

FIG. 3 shows a variation of the rain sensor according to the present invention. For reasons of clarity, only light conductor 20 is shown here in glass 11.

Figure 4:
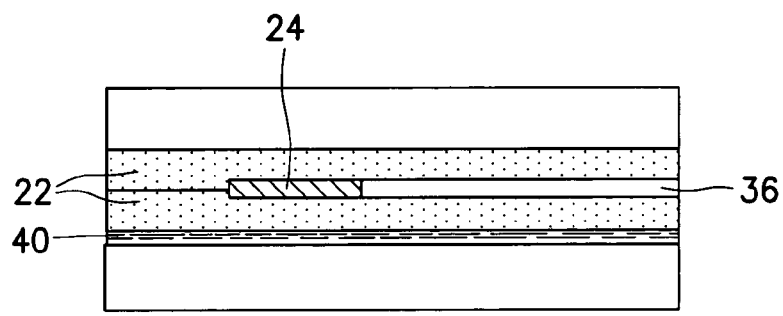

In a further variation, coupling-in element 24, as shown in FIG. 4, may also be arranged at the end face of core 36, and therefore in the same plane as core 36. This holds true in the same way for coupling-out element 28, as well as for retro-reflector 30.

Figure 5:
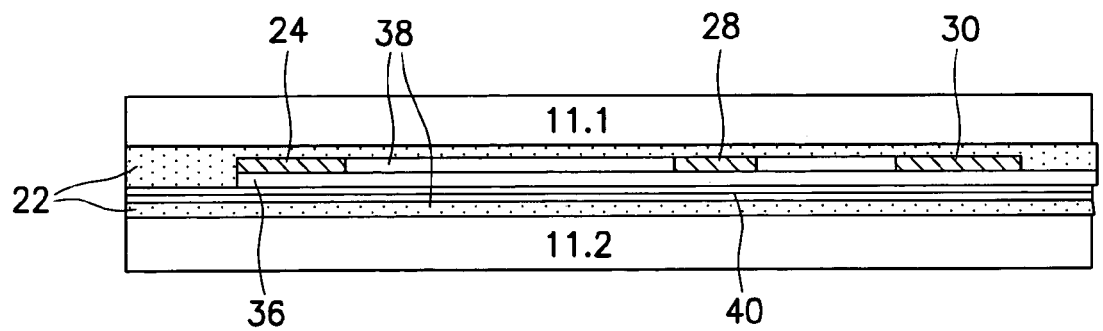
Figure 6:
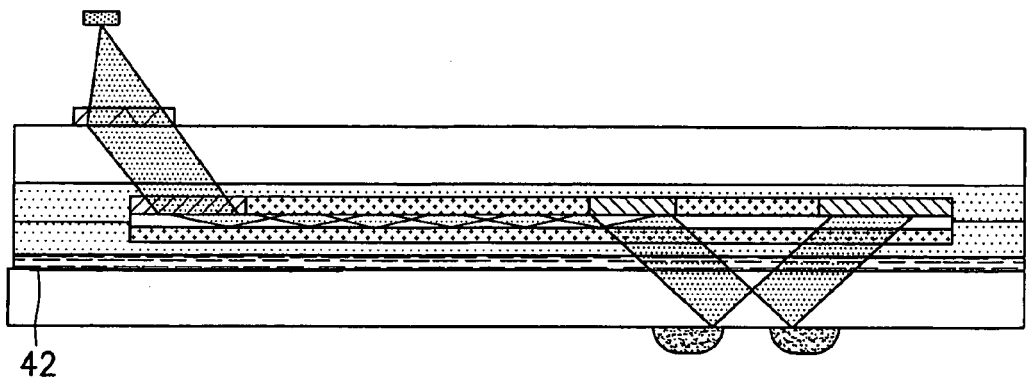

FIG. 5 shows another variation. Here, functional layer 40 additionally takes over the function of sheath 38, particularly on the side facing away from transmitter 18. To keep extraneous light away from the receiver, in FIG. 6, an iso-element for optical insulation, e.g. a black foil (film) or a black imprint, is arranged on the side of intermediate layer 22 opposite transmitter 18.

Figure 7:
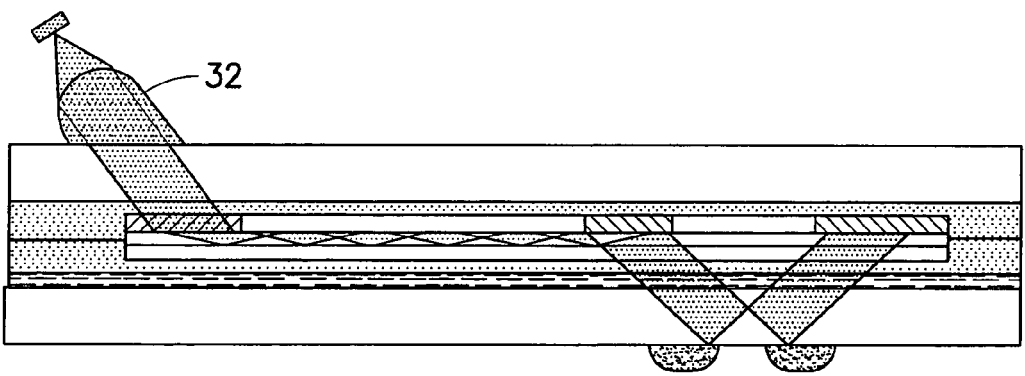
Figure 8:
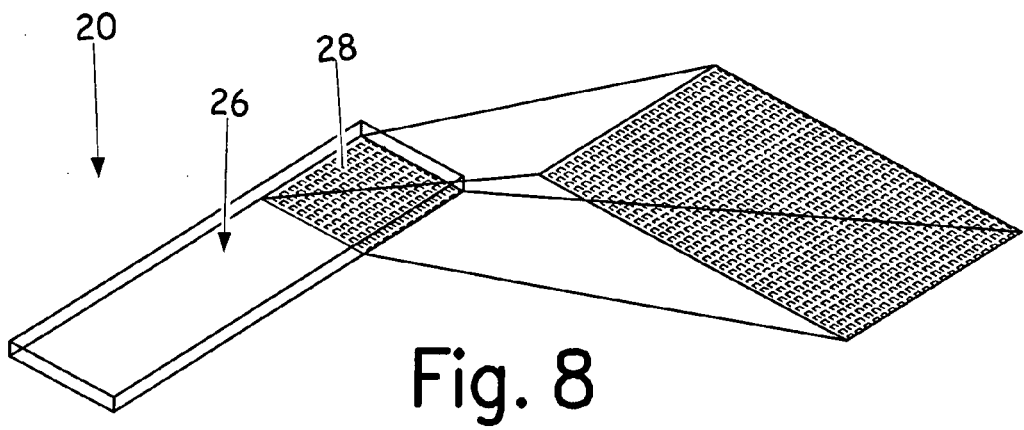

In FIG. 7, further light-conducting member 32 is provided with a lens structure and is constructed as a conventional optical element. FIG. 8 shows a part of light-conducting member 20, and specifically, a section of guide element 26, and coupling-out element 28. It is formed as a hologram film in such a way that it spreads the emerging beam fanwise, so that a larger sensitive region results on the glass.

In a further variation, the light conductor may be arranged on the inner side of the glass, and it is possible to dispense with coupling-in element 24. Instead, guide element 26 is bent up in such a way that its end face points directly toward transmitter 18, and in this way, the radiation is coupled into guide element 26. Here, light conductor 20 may also be brought out at the end face of glass 11 and bent into the interior of the vehicle. This may be achieved most simply by altering the cross-section, where the flat foil-type cross-section of light conductor 20 is converted into a round cross-section, so that it is possible to couple in the radiation without an adaptation optical system. In another variation, coupling-in element 24 may be split into a Y-shape, so that the light reflected back emerges from one arm of the Y, while the light from transmitter 18 is radiated into the other arm.

What is claimed is:

1. A rain sensor for a motor vehicle, the vehicle including a glass, the glass having an intermediate layer, the rain sensor comprising:
a light-conducting member adapted to be situated in the intermediate layer of the glass, the light-conducting member being an optically closed system that prevents radiation from impinging on a glass-air interface of the glass.

2. The rain sensor according to claim 1, wherein the light-conducting member includes a light-conducting core and an optically insulating sheath.

3. The rain sensor according to claim 1, wherein the light-conducting member includes a coupling-in element for coupling radiation into the intermediate layer of the glass.

4. The rain sensor according to claim 1, wherein the light-conducting member includes a guide element for guiding radiation in the glass.

5. The rain sensor according to claim 1, wherein the light-conducting member further includes a coupling-out element for coupling the radiation out of the guide element.

6. The rain sensor according to claim 1, wherein the light-conducting member includes a retro-reflector for reflecting radiation.

7. The rain sensor according to claim 3, wherein the coupling-in element is formed as a hologram.

8. The rain sensor according to claim 3, wherein the coupling-in element is formed as a surface hologram.

9. The rain sensor according to claim 5, wherein at least one of the guide element and the coupling-out element are formed as a hologram.

10. The rain sensor according to claim 5, wherein at least one of the guide element and the coupling-out element are formed as a volume hologram.

11. The rain sensor according to claim 2, wherein the sheath is composed of an adhesive.

12. The rain sensor according to claim 1, further comprising a further light-conducting member for coupling radiation into the glass.

13. A rain sensor for a motor vehicle, the vehicle including a glass, the glass having an intermediate layer, the rain sensor comprising:
a light-conducting member adapted to be situated in the intermediate layer of the glass, the light-conducting member being an optically closed system, wherein the light-conducting member is brought out of one end face of the glass.

14. A rain sensor for a motor vehicle, the vehicle including a glass, the
glass having an intermediate layer, the rain sensor comprising: a light-conducting member adapted to be situated in the intermediate layer of the glass, the light-conducting member being an optically closed system, wherein the light-conducting member includes an optical fiber between a transmitter and a coupling-in location.

15. A rain sensor for a motor vehicle, the vehicle including a glass, the
glass having an intermediate layer, the rain sensor comprising: a light-conducting member adapted to be situated in the intermediate layer of the glass, the light-conducting member being an optically closed system, wherein the light-conducting member includes an optical fiber between a coupling-out location and a receiver.

16. A rain sensor for a motor vehicle, the vehicle including a glass, the glass having an intermediate layer, the rain sensor comprising: a light-conducting member adapted to be situated in the intermediate layer of the glass, the light-conducting member being an optically closed system, wherein the light-conducting member includes an optical fiber, through which radiation is guided from a transmitter to a coupling-in location, and through which radiation is guided from a coupling-out location to a receiver.

* * * * *